Jan. 1, 1957
J. M. SCHAEFFER
2,776,073
CLEARING WHEEL MECHANISMS
Filed Sept. 3, 1952
3 Sheets-Sheet 1
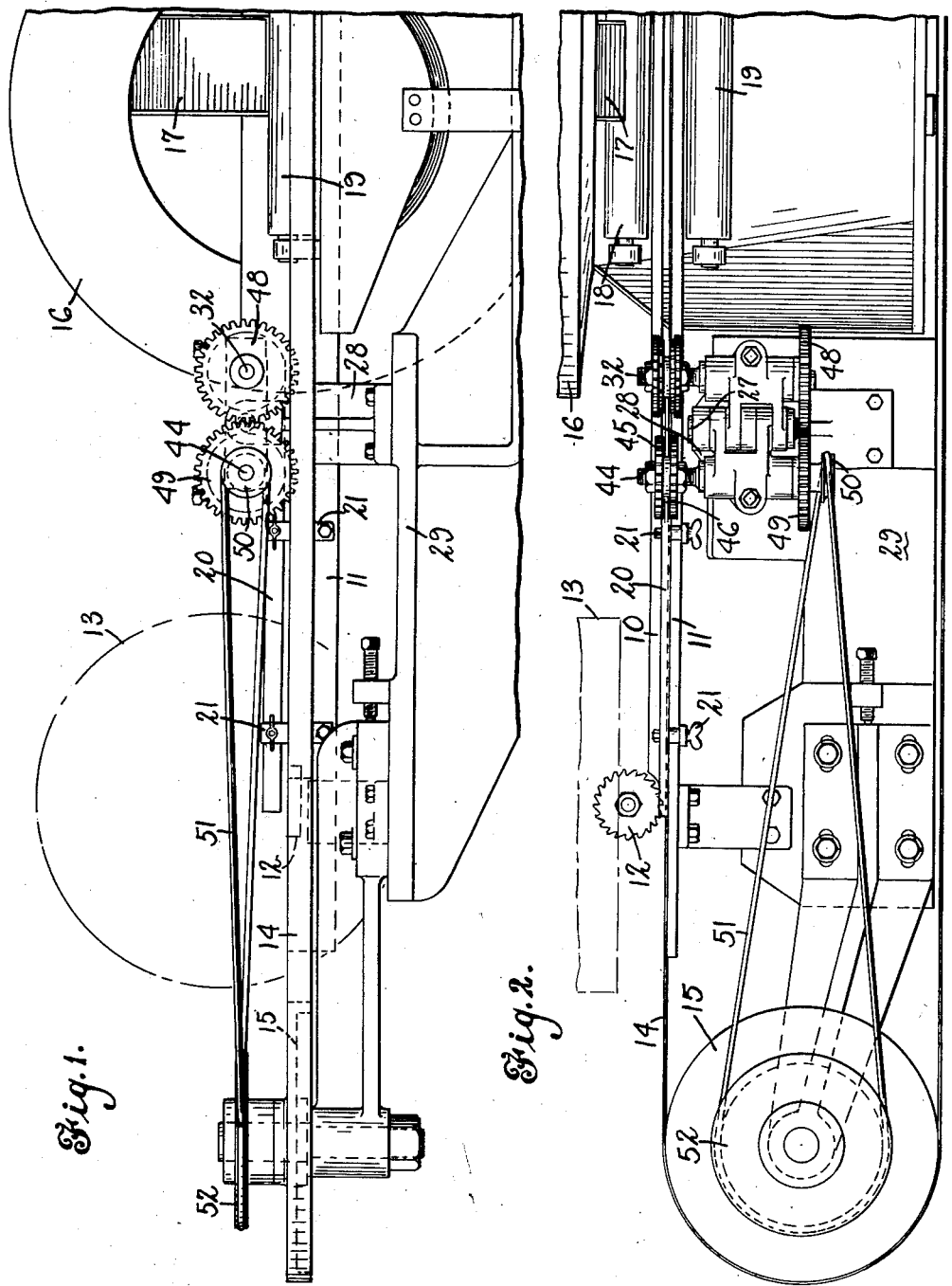
INVENTOR
Joseph M. Schaeffer
BY
Rockwell - Bartholow
ATTORNEYS Jan. 1, 1957  J. M. SCHAEFFER  2,776,073
CLEARING WHEEL MECHANISMS
Filed Sept. 3, 1952  3 Sheets-Sheet 2

INVENTOR
Joseph M. Schaeffer
BY
Rockwell & Barchotow
ATTORNEYS

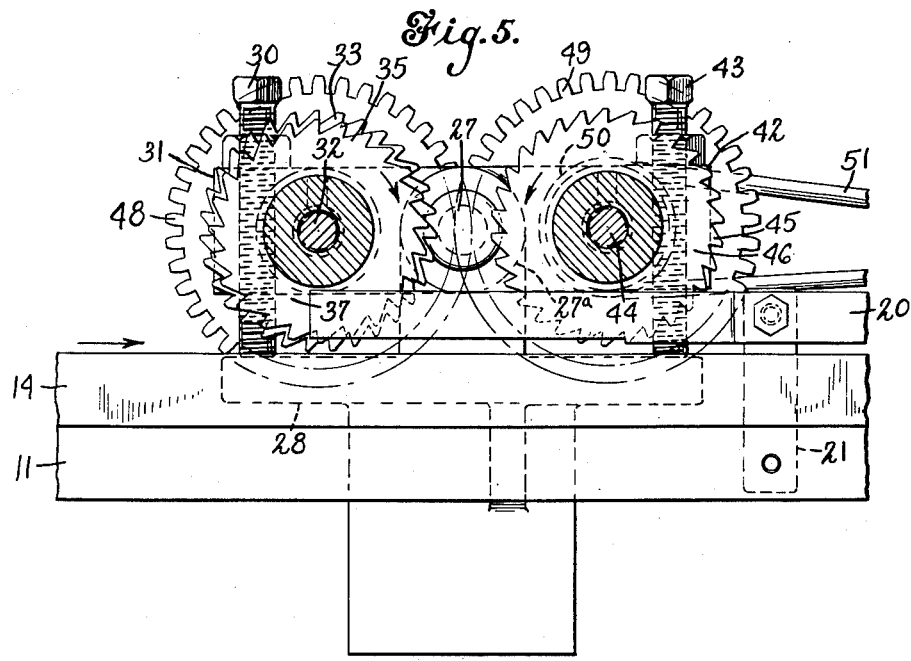
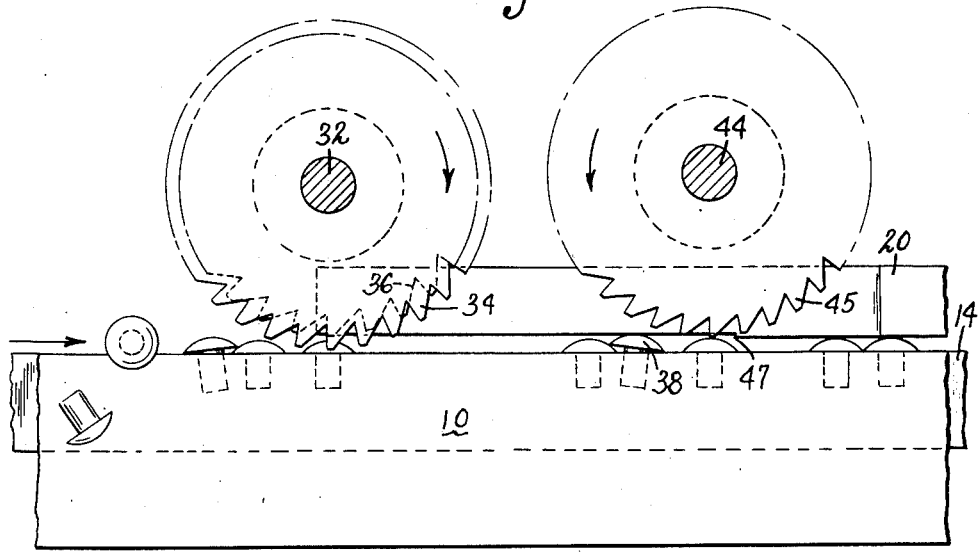

United States Patent Office 2,776,073
Patented Jan. 1, 1957

2,776,073

CLEARING WHEEL MECHANISMS

Joseph M. Schaeffer, Waterbury, Conn., assignor to The Waterbury Farrel Foundry & Machine Company, Waterbury, Conn., a corporation of Connecticut Application September 3, 1952, Serial No. 307,603

1 Claim. (Cl. 221—159)

This invention relates to clearing wheel mechanism and more particularly to a mechanism of this type for clearing and positioning blanks with respect to a chute or the like along which blanks are fed to a machine such as a slotting or thread-rolling or other machine for performing some operation upon the blanks.

In connection with machines for slotting the heads of bolts or screws and for rolling threads upon screws, means are usually provided to feed headed blanks to the processing machine, which blanks are fed along a chute comprising spaced parallel members with the shanks of the blanks extending between the sides of the chute, and the heads of the blanks carried upon the upper surface of these members. It will be obvious that the output of a machine of this kind can be no greater than the speed with which the blanks are fed to the machine. It is necessary, therefore, in connection with high speed slotting and thread-rolling machines to provide a feed such that the blanks will be fed to the machine in the proper position and in numbers sufficient to secure the most efficient operation of the processing machine.

In blank-feeding mechanisms of the type described above the chute is sometimes arranged at a considerable incline so as to effect a gravity feed of the blanks down the chute. In other instances the chute is disposed substantially horizontally and a traveling belt is provided to carry the blanks along this chute. The present invention is concerned with feeding mechanism of the latter type wherein the chute is disposed substantially horizontally or at least not at a sufficiently steep angle to provide for gravity feed of the blanks.

In mechanism of this character the blanks are usually delivered upon the chute in an excess quantity and many of them fall off the chute and are returned to the source of supply. The blanks delivered to the chute fall upon the same in a variety of positions, some being properly placed and others lying across the chute and in various positions which would interfere with their being fed to the machine. It is customary to provide some clearing mechanism such as a rotating clearing wheel, for example, to "kick" these improperly positioned blanks from the chute to be returned to the source of supply. However, in some instances where none of the blanks lie across the chute and would hence pass by the clearing wheel, the head of one blank will overlie or be pushed upon the head of another blank, particularly where the heads are thin or are provided with sharp edges. In such instances the pushing of one blank against another will tend to make the heads overlap, and where this condition is present, it will stop or obstruct the feed.

The present invention contemplates the provision of mechanism for straightening such blanks or moving them apart so that they still remain in the slot of the chute and are properly fed to the processing machine. As illustrated it resides in a second wheel or rotating member provided with teeth adapted to engage and nudge or push the blanks along the chute so as to separate them in order that the heads of the blanks lie flat upon the chute in proper position to be fed. It has been found that such a mechanism greatly increases the efficiency of the machine. In fact in one instance where only approximately two hundred blanks per minute could be fed with the ordinary clearing mechanism, the number was increased to two thousand per minute when my improved clearing wheel mechanism was employed.

One object of the present invention is to provide a new and improved feed mechanism for feeding screw or bolt blanks to a slotting or threading machine, for example.

A further object of the invention is to provide a novel clearing mechanism for maintaining the blanks in proper position upon a feed chute along which the blanks are carried so that they may be fed at increased speed to a processing machine.

A still further object of the invention is to provide an improved clearing wheel mechanism to clear headed blanks from a chute along which they are carried and also straighten or position these blanks in the chute whereby an increased rate of feed of the blanks will result.

To these and other ends the invention consists in the novel features and combinations of parts to be hereinafter described and claimed.

In the accompanying drawings:

Fig. 1 is a side elevational view of a feed mechanism embodying my invention;

Fig. 2 is a top plan view thereof;

Fig. 5 is a sectional view on line 5—5 of Fig. 4; and

Fig. 6 is a diagrammatic view similar to Fig. 5 showing the operation of my improved mechanism.

Figure 3:
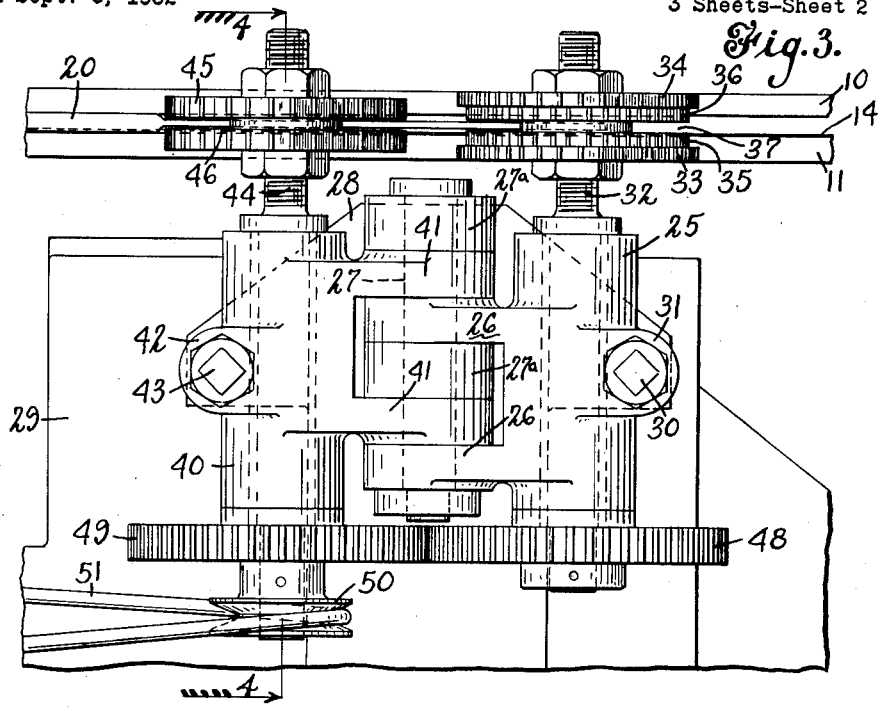
Fig. 3 is an enlarged top plan view of the clearing wheel mechanism.

To illustrate a preferred embodiment of my invention I have shown a feed chute comprising a pair of spaced members 10 and 11 along which the blanks are adapted to be fed. As stated, it is contemplated that the blanks will be headed members and, as shown in Fig. 6, the shanks of the blanks are adapted to lie between the members 10 and 11 while the heads rest upon the upper surface of these members. As shown the chute formed by these members guides the blanks to an indexing wheel 12 which may present them to some processing machine such as a screw-slotting mechanism, for example, represented diagrammatically at 13, which is not a part of the present invention.

As shown, the blank-carrying chute is disposed substantially horizontally, and an endless belt 14 is trained around a pulley 15, the belt passing adjacent one of the chute members 11 and the upper edge of the belt being as high or slightly higher than the upper surface of the chute so that the edge of the belt will engage the heads of the blanks and convey them laterally in the direction of the arrows shown in Figs. 5 and 6. The wheel 15 will be driven from the slotting machine in any desired manner or may, if desired, be provided with its own motor.

A hopper drum is shown at 16 which in the usual manner delivers blanks to an inclined chute 17 from which the blanks drop upon distributing rollers 18 and 19, one upon each side of the feed chute so that the blanks will be distributed along the chute and will be caused to drop thereupon. As previously stated, some of these blanks will drop into the chute in correct position with their heads resting upon the upper surface of the members 10 and 11, while others will lie across these members or in some other incorrect position in which they happen to fall. A chute cover is provided, as shown at 20, this cover consisting of a comparatively thin member secured by brackets 21 so that it stands above the space between the members 10 and 11 and its lower surface being closely adjacent the upper surface of the heads of the blanks, as shown in Fig. 6. Thus it assists in holding the blanks in proper position in the chute as they are carried along by the belt 14.

Figure 4:
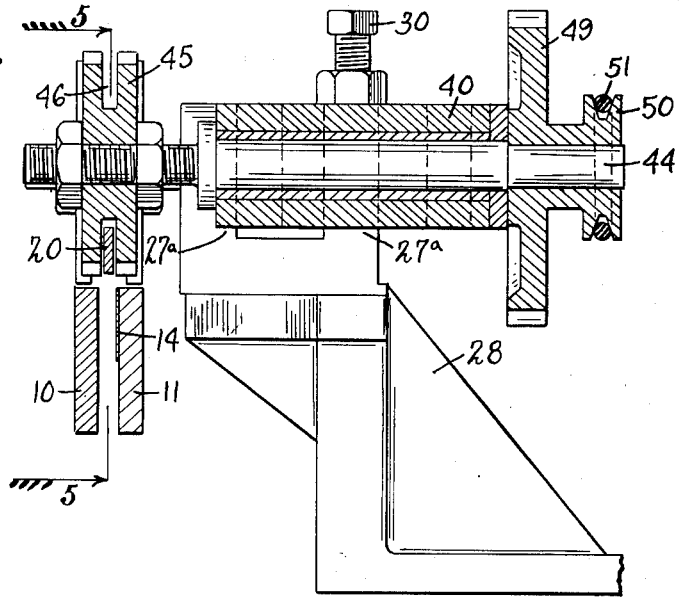
Fig. 4 is a sectional view on line 4—4 of Fig. 3.

As stated, the blanks may be deposited upon the members 10 and 11 in positions in which they cannot be fed to the processing machines, and these blanks must be cleared from the chute so that they will not interfere with the blanks which are properly positioned in the chute. For this purpose a clearing wheel assembly is provided, as shown in Figs. 3, 4 and 5. As shown, for example, in Fig. 3 a sleeve 25 is pivoted by arms 26 upon a pin 27 supported in spaced arms 27ª of a bracket 28 carried by the frame 29 of the slotting machine so that the sleeve 25 may rock to some extent about the pin. The sleeve is supported in adjusted position by an adjusting screw 30 which is threaded into a lug 31 of the sleeve 25, and at its lower end bears against the upper surface of a portion of the bracket 28. It is understood that the sleeve will tend to assume a lower position due to gravity, thus maintaining the lower end of the screw in engagement with the bracket.

Rotatably mounted in the sleeve 25 is a shaft 32 to which are secured a pair of spaced toothed wheels 33 and 34. The distance between these wheels is somewhat greater than the diameter of the heads of the blanks and, as shown in Figs. 5 and 6, these wheels are adjusted downwardly to a position close to the top of the chute members so that the heads of the blanks must pass between them, and so that the shank of a blank, if not confined to a position within the chute members, will be struck by the teeth of these wheels and thrown off the chute to be returned to the source of supply of the blanks (not shown).

Between the toothed wheels 33 and 34, a second clearing wheel is also secured to the shaft 32. This wheel comprises the two portions 35 and 36, each provided with teeth and which are separated by a groove 37. It will be noted that the diameter of the portions 35 and 36 is smaller than the diameter of the members 33 and 34, and that these members are not spaced sufficiently far apart to allow the heads of the blanks to pass therebetween. In other words, these members will clear the heads of the blanks when the latter are properly positioned in the chutes, but if one blank is riding on end or riding upon the head of another blank, it will be engaged and thrown clear of the chute. The groove 37 is provided in order to accommodate the chute cover 20. It will be seen, therefore, that this clearing wheel assembly consisting of the parts 33, 34, 35, and 36 will clear the chute of all of the blanks except those of which the shanks are properly positioned between the chute members.

However, as the blanks are carried along the chute, it will occur that some of those which pass the clearing wheel assembly just described will nevertheless be improperly positioned due to the fact that the head of one will be pushed up over the top of another, which position is shown at 38 in Fig. 6, and as such position impedes the rapid feeding of the blanks, it is desirable to provide means to move such blanks along and spread them out so that they will be properly positioned in the chute.

To this end a second rotating member is provided having teeth on its periphery which will engage the heads of the blanks and nudge or push them along so that the underface of the head of each blank will lie upon the members 10 and 11. A sleeve 40 is pivoted upon the pin 27 by the arms 41, and a lug 42 on this sleeve threadedly receives the adjusting screw 43, the lower end of which rests upon a part of the bracket 28 similarly to the adjusting screw 30 so that the sleeve 40 may be adjusted toward and from the bracket about the pin 27 as a pivot.

Rotatably mounted in the sleeve 40 is a shaft 44 upon one end of which is secured a toothed wheel 45, this wheel being provided with an annular groove 46 so as to permit the passage therethrough of the cover member 20 and to divide the toothed portion of the wheel into two parts, one lying on each side of the cover member.

It will be seen from Figs. 5 and 6 that the teeth of this wheel are positioned sufficiently far above the chute members 10 and 11 so that they will just clear the heads of the blanks when the latter are properly positioned in the chute and permit the blanks to pass below the teeth. If, however, any of the blanks are not properly positioned but ride over the edge of adjacent blanks, as shown at 38, these blanks will be engaged by the teeth of the wheel 45 and pushed forwardly with respect to the direction of movement of the belt 14 so as to properly space the blanks apart and position them within the chute.

It may also be noted that while the clearing wheel mechanism comprising the members 33, 34, 35, and 36 operates in a direction so that the points of the teeth engage the blanks and tend to throw them off the chute when the blanks are engaged by the teeth of these members, the wheel 45 preferably, but not necessarily, rotates in such a direction that the backs of the teeth rather than the points engage the heads of the blanks and tend to carry them along in the same direction as that of the travel of the endless belt. In other words, the teeth of the clearing wheel 45 which are adjacent the blanks move in the same direction as the blanks while the teeth of the clearing members 33, 34, 35, and 36 adjacent the blanks move in a direction opposite to that of the travel of the blanks. Also, the teeth of each of the first clearing members may, as shown, be cut at a slight angle with respect to the radius so that they present a relatively abrupt face on one side and an inclined face upon the other side.

It may also be noted that the cover member 20 is slightly offset as shown at 47 (Figs. 5 and 6) so that when the blanks have traveled beyond the wheel 45 the lower edge of the cover is somewhat closer to the chute than upon the other side of this wheel. This prevents any tendency of one blank to climb over an adjacent blank after they have been properly aligned or properly positioned by this wheel and insures that they be carried easily to the indexing wheel 12 to be delivered to the processing machine.

A gear 48 is mounted upon the shaft 32, the teeth of which are in mesh with a gear 49 mounted upon the shaft 44. Secured to the latter shaft is a pulley 50 around which is trained a belt 51, the belt being also trained around a pulley 52 on the shaft of the pulley 15 which carries the endless belt 14. In this manner the shafts 32 and 44 are driven from the pulley 15. It may be noted that the vertical adjustment of the shafts 32 and 44 by the adjusting screws 30 and 43 will be of relatively small amounts, and for this reason both of these shafts may be adjusted about the pin 27. There is sufficient play between the teeth of the gears 48 and 49 to allow this adjustment and still maintain the gears at all times in driving relation with each other.

It is believed that the operation of the device will be apparent from the above description. As shown diagrammatically in Fig. 6 of the drawings, the endless belt 14 travels in the direction of the arrow, and the two sets of clearing wheels also travel in the direction of the arrows thereon, the blanks moving from right to left, as shown in this figure. The first clearing wheel assembly which engages the blanks serves to throw off the chute all blanks which are not so positioned that their shanks project between the chute members 10 and 11, which blanks are returned to the hopper to be again delivered to the chute. The wheel 45 which lies beyond, and engages, the blanks which have passed the first wheel assembly serves to spread the blanks where the head of one rides upon the top of an adjacent blank and insures that they are properly positioned in the chute so that they progress through the chute without impeding a regular and rapid feed to the operating station. As has been stated, the teeth of the wheel 45 which are adjacent the blanks travel in the same general direction as the blanks and the blanks are engaged by the inclined edges of these wheels so as to be nudged or pushed along when properly spaced in the chute and are not thrown clear of the chute as is done by the first clearing wheel assembly.

While I have shown and described a preferred embodiment of my invention, it will be understood that it is not to be limited to all of the details shown, but is capable of modification and variation within the spirit of the invention and within the scope of the claim.

What I claim is:

In a blank-feeding mechanism, a chute along which the blanks travel, means to deliver blanks thereto, said chute comprising spaced members upon which the blanks are carried, a pair of rotating toothed clearing members disposed in position to engage the blanks on the chute, said members being disposed in tandem relation with respect to the direction of travel of the blanks, a bracket supported adjacent the chute, a pivot pin carried by the bracket, a pair of sleeve members each having arms secured thereto, said arms being pivotally mounted upon the pin and extending in opposite directions therefrom, a shaft rotatably mounted in each of said sleeve members, each of said shafts carrying one of said toothed members to support the latter for adjustment toward and from the chute about an axis of the pivot pin, means to rotate said toothed elements in opposite directions, said rotating means comprising a pinion on each shaft intermeshing with the pinion on the other shaft, and adjusting means carried by each of said sleeves for adjusting the clearance between the respective wheels and the chute, said adjusting means comprising a screw threadedly mounted in each of said sleeves and engaged at its lower end with the bracket to limit the approach of said toothed members toward the chute.

References Cited in the file of this patent

UNITED STATES PATENTS

| | | |
|---|---|---|
| 686,122 | Packer | Nov. 5, 1901 |
| 1,687,134 | Lynch et al. | Oct. 9, 1928 |
| 2,245,659 | Everett | June 17, 1941 |
| 2,383,270 | Niederer et al. | Aug. 21, 1945 |
| 2,531,099 | Anderson | Nov. 21, 1950 |